United States Patent [19]

Beg et al.

[11] Patent Number: 4,606,065

[45] Date of Patent: Aug. 12, 1986

[54] IMAGE PROCESSING-SYSTEM

[75] Inventors: Mirza R. Beg, Andover; Julius Perl, Burlington, both of Mass.

[73] Assignee: Imaging Technology Incorporated, Woburn, Mass.

[21] Appl. No.: 578,687

[22] Filed: Feb. 9, 1984

[51] Int. Cl.$^4$ ............................................. G06K 9/46
[52] U.S. Cl. ........................................ 382/18; 382/23
[58] Field of Search ...................... 382/18, 50, 51, 54, 382/16, 56, 19, 23; 358/282

[56] References Cited

U.S. PATENT DOCUMENTS

| | | | |
|---|---|---|---|
| 4,115,805 | 9/1978 | Morton | 382/23 |
| 4,115,806 | 9/1978 | Morton | 382/23 |
| 4,365,304 | 12/1982 | Ruhman et al. | 382/51 |

*Primary Examiner*—Leo H. Boudreau
*Attorney, Agent, or Firm*—Cesari and McKenna

[57] ABSTRACT

Level data on an output line (24) carrying the digitized output of a video camera and analog-to-digital converter (12) is processed by a combination circuit (10) to store in an acquisition memory (16) the results of a feature-identification or histogram operation. In a histogram operation, the memory locations of the acqustion memory (16) represent the bins into which the levels represented by the level data are sorted, and the contents of those locations indicate the number of picture elements whose levels fall in those bins. In feature identification, the contents of successive memory locations in the acqustion memory (16) contain the positions of those picture elements whose levels have a selected feature. Common circuitry performs both the histogram and feature-identification functions. To perform the histogram function, a counter (39), whose output provides the address for the acquisition memory (16), is operated to load the output of a look-up-table memory (22), which acts as an encoder to indicate the bin into which the level represented by the level signal belongs. An increment circuit (52) is then operated to read the contents of that location in the acquisition memory (16), increment it, and return the incremented value to the specified memory location. For feature identification, the contents of the look-up table (22) indicate whether the levels represented by the level signals have the selected features. A control circuit (30) monitors the output of the look-up-table memory and clocks the counter (39) whenever the selected feature is encountered. This changes the address for the random-access memory (16) to that of the next location in memory, and the increment circuit (52), which is incremented on the occurrence of every picture element to keep track of picture-element location, writes the position of the picture element having the selected feature into the next location in the random-access memory (16).

2 Claims, 1 Drawing Figure

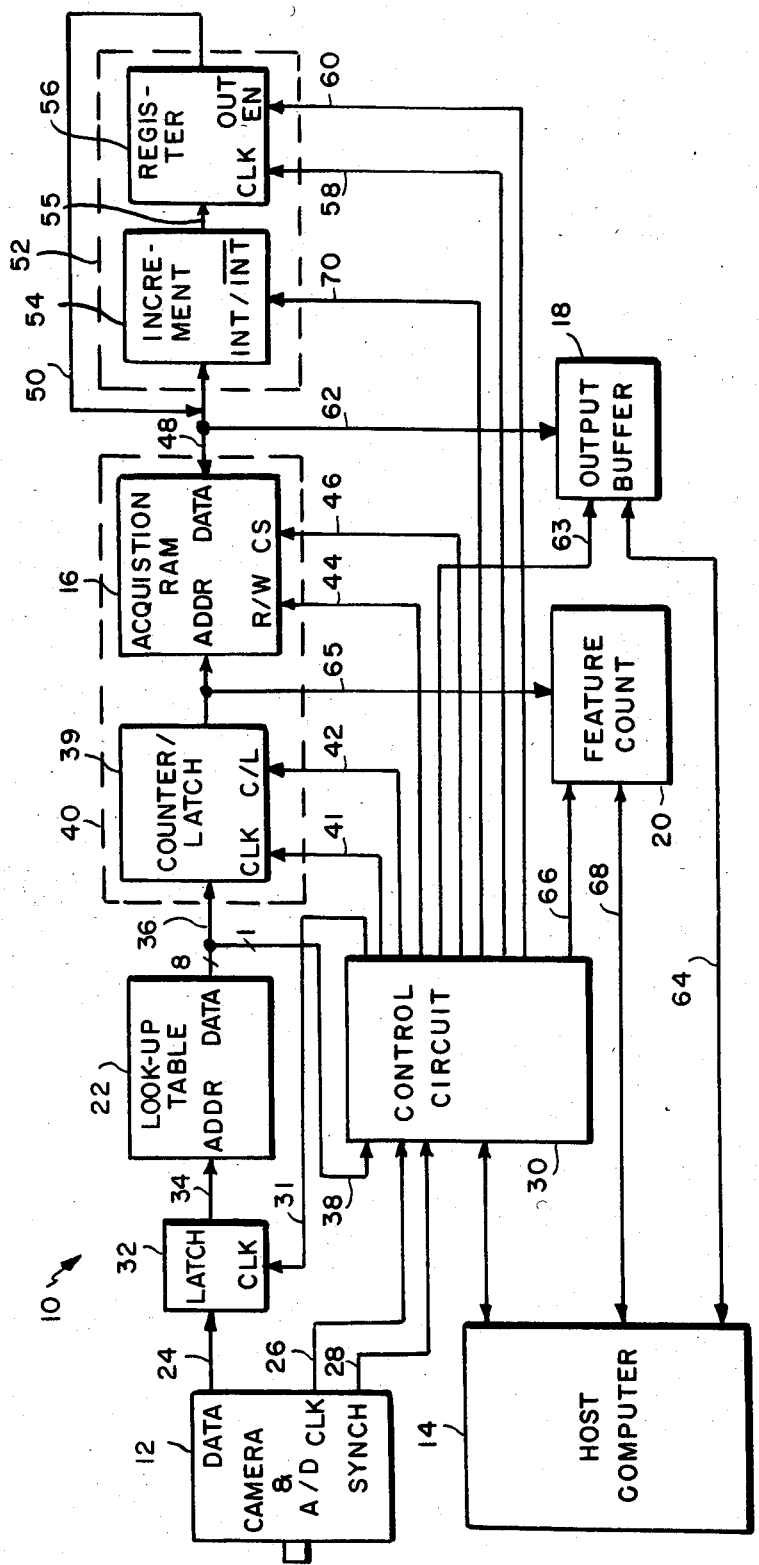

IMAGE PROCESSING-SYSTEM

BACKGROUND OF THE INVENTION

The present invention is directed to digital signal processing. It pertains particularly to the processing of signals representing video images.

The output of a video camera is often digitized to produce a sequence of digital level signals, each one representing the intensity of a picture element in the image seen by the camera. The sequence is typically stored in a memory and/or subjected to further processing.

There are many ways in which the processing may occur, but a large fraction of these processing techniques include one or both of two basic functions. These are the histogram and feature-identification functions.

The histogram function is a determination of the frequency with which various intensity levels occur in the image. For each level, or for each one of several predetermined groups of levels, the number of picture elements of the image having that level, or whose level falls within that group of levels, is ascertained. Such a step may be used, for instance, in assessing the general brightness or contrast of an image so that it can be adjusted automatically.

Feature identification is the process of locating the picture elements that have a particular level or have one of a particular group of levels. The feature-identification function can be used, for instance, in locating holes in a printed-circuit board.

The image processing that employs these functions is typically performed by processors in which software defines the process to be performed. However, there are many applications in which the speed required is high enough that software implementation of the basic histogram and feature-identification functions is not practical. Accordingly, the need has arisen for hardware implementation of these functions.

An object of the present invention is to perform sorting and feature identification by means of hardware that lends itself readily to real-time performance of the histogram and feature-identification functions.

Another object of the present invention is for the histogram and feature-identification functions to share hardware so that hardware requirements can be kept low.

SUMMARY OF THE INVENTION

The foregoing and related objects are achieved in a combination circuit that examines the level signal corresponding to each picture element in the image in succession. It includes a memory circuit, an increment circuit, an encoder, and a control circuit. In the feature-identification mode, the purpose of the combination circuit is to have the memory circuit, after the processing of one or more image frames, contain the locations of those picture elements that have the selected feature. The "feature," for instance, might be intensity above a predetermined level, and successive memory locations would contain the locations of those picture elements whose intensities are above that level.

In the histogram mode, on the other hand, location in the memory circuit function as various sorting "bins." After the processing of one or more image frames, memory locations contain the numbers of picture elements that belong to those bins. Each memory location can represent a range of intensity levels, for example, and a memory location would contain a number that indicates how many picture elements have intensity levels within that range.

The encoder receives the digital level signals and generates an indicator, in the histogram mode, of the bin to which the picture elements currently being examined belongs. In the feature-identification mode, the encoder generates an indication of whether the current picture element has the selected feature. These indications that the encoder produces will be referred to in this specification as "code signals," and the general purpose of the encoder can thus be described as being to provide a correspondence between level signals and code signals.

In addition to a memory, the memory circuit includes a counter circuit to which the encoder is connected so that it can apply the code signals to it in the histogram mode. The counter circuit supplies addresses to the memory, which is connected both to receive and to send data to the increment circuit, and the control circuit provides control signals to various elements of the circuit.

The counter and increment circuits are operated in one way when a histogram operation is to be performed and in a different way when a feature-identification operation is to be performed. In the histogram mode, the counter merely loads the code signals and applies them to the memory as the addresses of the bins to which the picture-element levels belong. The contents of the location specified by an address are read by the increment circuit, which increments the contents by one and returns the resultant value to the memory location from which the original value was obtained. In this way, a memory location functioning as a particular sorting bin is incremented whenever the combination circuit receives a signal representing an intensity level belonging to that bin.

In contrast, when the combination circuit is in the feature-identification mode, the increment circuit does not increment the contents of any particular memory location; it merely increments an internally stored value each time a new picture element is examined, thereby keeping track of the position in the image of the picture element represented by the current level signal. At the same time, the control circuit monitors the code-signal output of the encoder to determine whether the picture element under examination has the selected feature. The counter, rather than loading the code signals, is incremented after each detection of a signal level representing the selected feature. Whenever a selected feature is encountered, therefore, the counter output points to the next location in the memory. As it does so, the output of the increment circuit, which contains the current picture-element location, is written into the memory. Successive locations in the memory thus end up containing the positions of picture elements that have the selected feature.

Accordingly, common circuitry can be switched between the feature-identification and histogram features by merely changing the mode of operation of a couple of the elements in the circuit.

BRIEF DESCRIPTION OF THE DRAWING

The sole drawing FIGURE is a simplified block diagram of the image-processing circuit of the present invention.

DETAILED DESCRIPTION OF THE PREFERRED EMBODIMENT

The drawing depicts a combination sorting and feature-identification circuit that performs sorting in one mode and feature identification in another on the output of a source of digital signals representing levels in an image. The source of the level signals may, for instance, be a television camera and analog-to-digital converter 12, although it will be apparent that the teachings of the present invention can be applied to the output of other sources of such signals.

Typically, a host computer 14 uses the results of the operation performed by the combination circuit 10. These results are contained in an acquisition memory 16 and are passed to the host computer by means of an output buffer 18.

The typical image signals are digitized television video signals, in which the level information is generated as an image is scanned. The combination circuit 10 processes the signals in real time, and, at the end of one or more frames, the acquisition memory 16 contains histogram or feature-identification information. During vertical blanking—i.e., when the source 12 generates no level information—the information in the memory 16 is transferred to the output buffer 18, from which the host computer 14 can fetch it at its own speed. In the feature mode, further information is contained in a feature-count circuit 20, which is a register that contains the number of features detected.

The operation of the circuit in the feature-identification mode will be described first, and the sorting mode will be described later. In the feature-identification mode, a look-up-table memory 22, which acts as an encoder, has locations corresponding to each possible level signal. In each location, there is a code that indicates whether that level has the selected "feature." For example, the selected feature may be that the brightness is above a certain level. In such a case, all of the locations whose addresses are below a certain number would contain zeros, indicating that those levels do not have the selected feature, while all locations whose addresses are above that number would contain ones, indicating that they do have the selected features. The code values in the look-up-table memory 22 can be changed by commands from the host computer 14.

The processing begins with the reception of data from the data source 12 over a data path 24, which may consist of eight parallel data lines. Other outputs of the source 12 are clock and synchronization signals. These are sent over data paths 26 and 28 to a control circuit 30, which establishes the mode and sets the timing for the rest of the combination circuit 10. In particular, the control circuit 30 sends a clock signal on a clock line 31 upon the reception of clock signals from the data source 12. The clock signals from the data source 12 indicate when signals representing a new picture element are being sent, and a latch circuit 32 receives the clock signals on line 31 and latches data from data path 24 on their occurrences.

The latch output is transmitted along a signal path 34 to the address port of the look-up-table memory 22 to point to the look-up-table location corresponding to the level that the latch output represents. The contents of that look-up-table location indicate whether the level has the selected feature; a one indicates that the level has the selected feature, and a zero indicates that it does not. A code signal representative of the contents of the memory location is placed on data path 36.

Others of the data paths consist of a plurality of data lines, but the drawing indicates explicitly the eight-line organization of data path 36 only. This is to distinguish it from a single data line 38 that leads from data path 36 to the control circuit 30. Data line 38 carries the least-significant bit of the code signal produced by the look-up table 22; only the least-significant bit is needed to determine whether the look-up-table location contains a zero or a one. The control circuit 30 employs this information in controlling a counter 39, which is part of a memory circuit 40 that also includes the acquisition memory 16.

By means of control lines omitted from the drawing for the sake of simplicity, the control circuit resets the counter 39 before the start of each frame. Then, whenever the control circuit 30 determines by virtue of the presence of a one on line 38 that the level representing a picture element has the desired feature, the memory location indicated by the counter receives the image location of the picture element having the feature. The control circuit 30 then sends a clock signal on line 41 to cause the counter 39 to increment its count by one so that it points to the next location in the acquisition memory 16, which will receive the image location of the next picture element that is found to have the selected feature. A signal line 42 leading from the control circuit 30 to the counter circuit causes the counter 39 to count, not load, on the occurrence of a clock signal on line 41. The signal on line 42 always indicates the count mode when the feature-identification operation is being performed; as will be seen below, it indicates the load mode when the combination circuit 10 performs its histogram function.

Since the counter 39 is incremented whenever the control circuit 30 detects a picture element having the selected feature, the output of the counter 39 is an indication of the number of features identified in the frame. It is also used by the random-access memory 16 as an address into which data are written when the control circuit 30 detects the selected feature. Specifically, in the feature-identification mode, the control circuit 30 holds a signal on line 44 that indicates to the acquisition memory 16 that data are to be written into it, rather than read from it, when a pulse occurs at its chip-select (CS) port. When the control circuit 30 detects the selected feature, it applies a pulse to a chip-select (CS) port of the acquisition memory 16 by means of a signal line 46 to strobe data on signal path 48 into the memory location whose address is the counter output.

In the feature-identification mode, data signals reach signal path 48 from signal path 50, which carries the output of an increment circuit 52. The increment circuit 52 contains an incrementer 54 whose output is conducted by a data path 55 to a register 56. At the beginning of a frame, the register 56 is reset so that its output represents the position of the first picture element in a frame, and the control circuit 30 sends clock signals to the register 56 upon each picture-element change to cause the register 56 to load the output of incrementer 54. Incrementer 54 typically produces as an output a digital value that is one greater than the input value that it receives on signal path 48, so the contents of register 56 are ordinarily incremented by one when each clock signal occurs.

As was mentioned above, the signal on signal path 48 is the output of the increment circuit 52 when the combination circuit 10 is in the feature-identification mode. This happens because the control circuit 30 holds a signal on line 60 that enables the tri-state output port of register 56. As will be described below, this port is sometimes disabled when the combination circuit 30 is in its sort mode.

The result of this operation of the increment circuit 52 is that its output represents the location of the picture element whose level is currently represented by the signals on signal path 24. Since the control circuit 30 causes the acquisition memory 16 to read in the output of the increment circuit 52 whenever it detects a level having the selected feature, the random-access memory 16 contains in successive memory locations the positions in the image where the levels have the desired feature.

By means of signal lines omitted from the drawing for the sake of simplicity, the control circuit 30 operates the acquisition memory 16 during the vertical blank time of the received image signal to read out the contents of all of its memory locations onto signal path 48. These data are transmitted over signal path 62 to the output buffer 18, which the control circuit 30 operates by signals sent along signal path 63 to cause it to read in the feature-identification data. The host computer 14 can then read the information from the output buffer 18 over data path 64.

At the end of the frame, the output of the counter 39 contains the total number of identified features, and this information is passed along data path 65 to the feature-count register 20, which loads the information in response to a load command on signal path 66 from the control circuit. The host computer 14 can read the feature-count information over a data path 68.

It should be noted that it was assumed in the preceding description that the incrementer 54 in the increment circuit 52 simply incremented by one. This is true if the imaging device works in a non-interlace mode—that is, if the imaging device scans every line in succession, not every other line. But many imaging devices operate in an interlace mode—that is, they scan only odd-numbered lines during one vertical sweep and then scan only even-numbered lines during the next vertical sweep.

The incrementer 54 is arranged so that it can accommodate both interlace and non-interlace devices. If the image is organized into five hundred twelve lines by five hundred twelve picture elements per line, for instance, the number contained in the register 56 may be an eighteen-bit binary number in which the nine less-significant bits indicate position within a line and the nine more-significant bits indicate the line number. In the non-interlace mode, this number simply is incremented whenever the register 56 is clocked. The incrementer 54 is arranged, however, so that it responds to a carry from the ninth bit in different ways in accordance with the value of the signal on a signal line 70 from control circuit 30, which indicates whether the imaging device is operating in an interlace or in a non-interlace mode. In a non-interlace mode, a carry from the ninth bit merely causes incrementing of the tenth bit. In the interlace mode, however, a carry from the ninth bit causes incrementing of the eleventh bit, while the tenth bit, which indicates whether the line number is even or odd, does not change. At the beginning of one vertical sweep, the tenth bit is set to a zero to indicate that even-numbered lines are being scanned, and the tenth bit is set to one on the next frame to indicate that odd-numbered lines are being scanned. Thus, although the increment circuit 52 increments upon each clock signal on line 58, it does not always increment by one.

The operation of the combination circuit 10 is different in the histogram mode. The signal on line 42 indicates to the counter 39 that it sould load data from signal path 36, not count, on each clock signal. Also, the increment circuit 52 takes its input, not from its own output, but rather from the output of the random-access memory 16.

The result of the different operations of the elements just described is that the circuit that previously was used for feature identification now performs the histogram function. Specifically, the latch 32 and look-up table 22 operate as before to present code signals on data path 36 that correspond to the signal levels received on data path 24. However, the code signals that appear on data path 36 in the histogram mode represent memory locations in the random-access memory 16 into which data are to be loaded; they do not indicate whether the counter 39 is to be clocked. By means of signal lines omitted from the drawing for the sake of simplicity, the control cicuit can load the look-up-table memory 22 with contents dictated by the host computer so as to indicate the sorting bins to which different signal levels belong. The same lines are used to indicate the features that the circuit is to identify.

The counter 39 is clocked on the reception of new level signals in the histogram mode without regard to the code values present on data path 36. The control circuit sends a signal on line 42 to indicate that the counter 39 is to load the values of the signals on data path 36 whenever a clock signal occurs, so these code signals are passed through to the address ports of the acquisition memory 16. These signals are the addresses of acquisition-memory locations representing the sorting bins whose contents are to be incremented.

To increment the contents of an acquisition-memory location, the control circuit 30 initially applies a read signal on line 44 to the acquisition memory 16 and a chip-select signal on line 46 to cause the acquisition memory 16 to assert the contents of the location representing the selected bin onto signal path 48. The signals being asserted by the random-access memory onto signal lines 48 do not conflict with the output of the increment circuit 52, because the control circuit presents a signal on line 60 to the register 56 to cause its tri-state output port to be disabled.

The data output that the acquisition memory places on data path 48 represents the number of picture elements whose levels have been identified as belonging to the bin indicated by the address signals from the counter 39. These data signals are applied to the increment circuit 54 and ripple asynchronously through it so that a number appears on signal path 55 that is one greater than the number on signal path 48. The control circuit 30 then sends a clock signal to the register 56 to cause it to load the incremented signal. It also removes the chip-select signal from data line 46 so that the tri-state data output port of the random-access memory 16 no longer asserts signals onto the data path 48, and it places an enable signal on line 60 so that the tri-state output port of the register 56 asserts the incremented value onto the data path 48. The control circuit places a write signal on line 44 to prepare the acquisition memory 16 for a write and then pulses the chip-select line 46 to strobe the incremented value into the memory location.

It should be noted that two accesses of the random-access memory are needed in the histogram mode: one to read the current value in the selected bin and the other to write the incremented value back into the bin. This contrasts with the operation in the feature-identification mode, in which only one access is necessary. Since a signal representing a single picture element may last only one hundred nanoseconds, two accesses of some embodiments of the random-access memory 16 may take more time than is available. With such memories, real-time sorting would not be possible if the output for every picture element of every frame were to be sorted. If this difficulty arises, it is readily remedied by handling two frames as a unit and sorting only every other picture element in each frame. That is, the odd-numbered picture elements could be sorted in the first frame and the even-numbered picture elements would be sorted in the second frame. For stationary images, the result of such a histogram process would be the same as the result of sorting every picture element in every frame, and there would be only a slight difference for most non-stationary video images.

At the end of a frame (or pair of frames), the acquisition memory 16 will have in its memory locations the number of picture elements whose levels fall in the bins represented by those locations. Between frames or pairs of frames, the control circuit 30 can operate the acquisition memory 16 to read its contents into the output buffer 18, as was mentioned before, and the host computer 14 can read the contents of the buffer 18 over signal path 64. The acquisition memory is then cleared before the start of the next frame.

It is thus apparent that the device described above readily provides the histogram and feature-identification functions employed in many types of image-signal processing. Furthermore, it performs these functions with a minimum of hardware by employing circuitry in which most elements have functions in both the histogram and the feature-identification modes.

We claim:

1. A combination circuit for performing feature-identification and histogram functions on the output of an imaging device that produces sequences of digital level signals representing the intensity levels of picture elements in an image and clock signals indicating when a new picture element is represented by the current level signal, the combination circuit comprising:
   A. a programmable encoder, operable by application of programming signals thereto to establish a correspondence between digital level signals and digital code signals, for receiving level signals and producing in response the corresponding code signals, each code signal indicating whether a picture element whose intensity is represented by the corresponding level signal has a selected feature when the combination circuit performs feature identification and indicating the sorting bin to which a picture element whose intensity is represented by the corresponding level signal belongs when the combination circuit performs the histogram function;
   B. a counter connected to receive the code signals, operable by application of load signals thereto to store the values of the code signals, and operable by application of count signals thereto to increment the value stored therein, for producing counter signals representing the stored value;
   C. a memory circuit including a plurality of memory locations, connected to receive the counter signals, operable by application of write signals thereto to store in memory locations indicated by the counter signals the values of data signals applied thereto, and operable by application of read signals thereto to produce memory signals having the values stored in the memory locations indicated by the counter signals;
   D. an increment circuit for storing an index value, the increment circuit being operable by application of mode-select signals thereto to assume one of a feature-identification state and a histogram state, connected to receive the memory signals and to apply data signals to the memory circuit, operable in the feature-identification state by application of increment signals thereto to increment the index value stored therein and produce data signals having the resultant value, and operable in the histogram state by application of increment signals thereto to increment the values of the received memory signals and produce data signals having the resultant values;
   E. a control circuit selectively operable in a feature-identification mode and in a histogram mode, connected for reception of the clock signals and for application of load and count signals to the counter, read and write signals to the memory circuit, and mode-select and increment signals to the increment circuit, for,
      i. in the feature-identification mode, applying mode-select signals to the increment circuit to cause it to assume its feature-identification mode, applying increment signals to the increment circuit in response to the clock signals to cause it to apply data signals to the memory that indicate the position of the current picture element, receiving code signals from the encoder, applying a count signal to the counter whenever the code signal indicates that the level signal has the intended feature so that the counter signal represents the address of the next location in the memory, and operating the memory to cause it to store in the location indicated by the counter signal the value represented by the data signal from the increment circuit, the memory thereby storing in successive locations the positions of picture elements having the intended feature, and
      ii. in the histogram mode, applying mode-select signals to the increment circuit to cause it to assume its histogram state, applying load signals to the counter circuit in response to the clock signals to cause it to store the code signals and produce counter signals indicating the bins to which the levels indicated by the level signals belong, operating the memory to cause it to produce memory signals representing the current value in the memory location addressed by the counter signals, applying increment signals to the increment circuit to cause it to increment the value represented by the memory signals and apply data signals to the memory that represent the resultant value, and applying write signals to the memory to cause it to store the incremented value in the location addressed by the counter signals, the memory thereby storing in memory locations representing sorting bins the number of picture elements that belong to those bins.

2. A combination circuit as defined in claim 1 wherein:
   A. the increment circuit includes:
      i. a register element, including means for storing the index value, for producing as the data signals signals representing the index value; and
      ii. an increment element, connected selectively to receive as its increment-element input the memory signals and the data signals, for incrementing the value represented by the increment-element input and applying to the register element signals representing a value incremented from the value represented by the increment-element input; and
   B. the control circuit applies its mode-select signals to the increment circuit to cause the increment element to increment the values represented by the memory signals in the histogram mode and to increment the values represented by the data signals in the feature-identification mode.

* * * * *